United States Patent
Manikowski, Jr. et al.

(10) Patent No.: US 6,209,494 B1
(45) Date of Patent: *Apr. 3, 2001

(54) HYBRID FUEL-CELL ELECTRIC-COMBUSTION POWER SYSTEM USING COMPLETE PYROLYSIS

(75) Inventors: Ambrose F. Manikowski, Jr., Cupertino; Gary M. Noland, Pleasanton, both of CA (US)

(73) Assignee: Procyon Power Systems, Inc., Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/396,827

(22) Filed: Sep. 14, 1999

Related U.S. Application Data

(63) Continuation-in-part of application No. 08/819,581, filed on Mar. 14, 1997, now Pat. No. 5,899,175.

(51) Int. Cl.[7] .................................................... F02B 43/08

(52) U.S. Cl. ........................................ 123/3; 123/DIG. 12

(58) Field of Search .................................. 123/3, DIG. 12

(56) References Cited

U.S. PATENT DOCUMENTS

| 3,296,449 | 1/1967 | Plust et al. . |
| 4,070,993 | 1/1978 | Chen . |
| 4,143,620 | 3/1979 | Noguchi et al. . |

(List continued on next page.)

FOREIGN PATENT DOCUMENTS

| 0 33 44 74 | 9/1989 | (EP) . |
| 0 48 59 22 | 5/1992 | (EP) . |
| 1 40 22 07 | 8/1975 | (GB) . |
| 1 44 78 35 | 9/1976 | (GB) . |

OTHER PUBLICATIONS

Blakey et al., "A design and experimental study of an Otto Atkinson cycle engine using late intake valve closing" *SAE Technical Paper 910451* (1991). 10 pages total.

Boggs et al., "The Otto–Atkinson cycle engine—full economy and emissions results and hardware design" *SAE Technical Paper 950089* (1995). 14 pages total.

Jidosha K.K. (Apr. 17, 1985). Patent Abstracts of Japan, 9(87):M–372. And JP 59213940, Nissan Dec.3, 1984 (see abstract).

(List continued on next page.)

*Primary Examiner*—John Kwon
(74) *Attorney, Agent, or Firm*—Morrison & Foerster, LLP (57) ABSTRACT

This is a procedure for producing mechanical power and a hybrid power generation unit for practicing such a process. In particular, the procedure uses a thermal or catalytic cracker to crack or to pyrolyze (partially or completely) a liquid or gaseous petroleum fuel to produce a primary gaseous stream primarily containing hydrogen (and likely methane or other short-chain hydrocarbons). The hydrogen may be used in a fuel cell to produce electricity, which electricity is used in a linear or rotary electric motor. In the preferred procedure, the residuum of the pyrolyzed feedstock is laid down in the reactor. A regeneration step is used to remove that residuum and produce a carbon monoxide-rich gas which then may be introduced to an internal or external combustion engine for further production of mechanical power. Most preferred of the combustion engines is one having high thermal efficiency. This combination of pyrolysis, fuel cell, and high efficiency heat engine results in a procedure and device which is significantly more efficient in terms of utilizing the energy present in the feedstock hydrocarbon fuel. Additionally, under high temperature operation when the fuel to the engine is a carbon monoxide-rich gas, the emissions from the system will be substantially lower than for conventional power systems. Finally, when some portion of the process heat required by the pyrolysis and de-coking operations is obtained from waste heat from the engine, an increase in the total thermal content of the fuel can be realized, further increasing the overall fuel economy of the hybrid system.

20 Claims, 8 Drawing Sheets

U.S. PATENT DOCUMENTS

| | | |
|---|---|---|
| 4,147,136 | 4/1979 | Noguchi et al. . |
| 4,147,142 | 4/1979 | Little et al. . |
| 4,185,966 | 1/1980 | Frie et al. . |
| 4,362,137 | 12/1982 | O'Hare . |
| 4,597,363 | 7/1986 | Emelock . |
| 4,722,303 | 2/1988 | Leonhard . |
| 4,735,196 | 4/1988 | Parsons . |
| 4,862,836 | 9/1989 | Chen et al. . |
| 4,884,531 | 12/1989 | Degnan, Jr. et al. . |
| 5,159,900 | 11/1992 | Dammann . |
| 5,248,566 | 9/1993 | Kumar et al. . |
| 5,409,784 | 4/1995 | Bromberg et al. . |
| 5,425,332 | 6/1995 | Rabinovich et al. . |
| 5,435,274 | 7/1995 | Richardson, Jr. . |
| 5,692,459 | 12/1997 | Richardson, Jr. . |
| 5,744,015 | 4/1998 | Mazanec et al. . |
| 5,899,175 | * 5/1999 | Manikowski, Jr. et al. ............. 123/3 |

OTHER PUBLICATIONS

Jost, K. (Feb. 2, 1997). "Gasoline–Reforming Fuel Cell," *Automotive Engineering*, 105(2):151–152, XP000682325.

Jukogyo K.K. (Apr. 27, 1985). Patent Abstracts of Japan, 9(99):E–311. And JP 59224074 A., Mitsubishi Dec. 15, 1984, (see abstract).

Luria et al., "The Otto–Atkinson engine—a new concept in automotive economy" *SAE Technical Paper 820352* (1982). 8 pages total.

Saunders et al., "Variable valve closure timing for load control and the Otto Atkinson cycle engine" *SAE Technical Paper 890677* (1989). 12 pages total.

\* cited by examiner

HYBRID FUEL-CELL ELECTRIC-COMBUSTION POWER SYSTEM USING COMPLETE PYROLYSIS

This application is a C-I-P of Ser. No. 08/819,581 filed Mar. 14, 1997, U.S. Pat. No. 5,899,175.

FIELD OF THE INVENTION

This is a procedure for producing mechanical power and a hybrid power generation unit for practicing such a process. In particular, the procedure uses a thermal or catalytic cracker to crack or to pyrolyze (partially or completely) a liquid or gaseous petroleum fuel to produce a primary gaseous stream primarily containing hydrogen (and likely methane or other short-chain hydrocarbons) and a second intermediate stream. The hydrogen may be used in a fuel cell to produce electricity, which electricity is used in a linear or rotary electric motor. The second intermediate stream, a liquid fuel under low temperature operation, or preferably carbon monoxide-rich gas under high temperature operation, may be introduced to an internal or external combustion engine for further production of mechanical power.

For partial pyrolysis at low temperatures (below 650° C.), the second intermediate stream exits the fuel processor as a partially dehydrogenated gas and is then condensed primarily to a liquid and possibly some non-condensable gases for use in the engine.

For total pyrolysis at high temperatures (above 650° C.), carbon coke from the input petroleum fuel is deposited in the reactor, e.g., on the catalyst bed, during pyrolysis. This carbon coke is removed by introducing an oxygen carrying gas such as steam, carbon dioxide or other suitable gas or mixture thereof to form a carbon monoxide-rich gas to fuel the engine.

Most preferred of the combustion engines is one having high thermal efficiency. This combination of pyrolysis, fuel cell, and high efficiency heat engine results in a procedure and device which is significantly more efficient in terms of utilizing the energy present in the feedstock hydrocarbon fuel. Additionally, under high temperature operation when the fuel to the engine is a carbon monoxide-rich gas, the emissions from the system will be substantially lower than for conventional power systems. Finally, when some portion of the process heat required by the pyrolysis and de-coking operations is obtained from waste heat from the engine, an increase in the total thermal content of the fuel can be realized, further increasing the overall fuel economy of the hybrid system.

BACKGROUND OF THE INVENTION

The vast majority of all engine-driven vehicles in operation today use internal combustion engines using either a Diesel cycle or the Otto cycle. A very few automotive vehicles are powered by external combustion engines such as gas turbines, Stirling cycle engines, or steam engines. A relatively small number of vehicles are powered by electric motors.

Each class of motor vehicle propulsion system has its benefits and detriments. The Diesel cycle engines are simple and robust while utilizing significant amount of the energy found in its hydrocarbon fuel. The exhaust from most such diesel cycle engines is high in nitrogen oxides and carbon particulates. The Otto cycle engines are probably the most highly engineered mechanical device existing on earth. Although the efficiency of Otto cycle power plants as used in automotive vehicles has significantly improved since their first use in the latter part of the 19th century, their efficiency (based on the potential energy content of the fuel) is not high because of the low compression ratios associated with gasoline engines. In general, these engines can be made into quite lightweight packages for use in a variety of vehicles.

Vehicles using electric motors are currently not as flexible and practical as are those using one of the internal combustion engine power plants. Although acceleration and top speed of such electric vehicles may match those of internal combustion-engined vehicles, electric motor-powered vehicles have a significant detriment because of their need for batteries. A variety of different battery systems have been proposed for use in such vehicles. Lead-sulfuric acid batteries remains the primary choice for such vehicles as other, more advanced technology, batteries are being developed. Obviously, lead-acid batteries are quite heavy and often have a lengthy charging cycle. Such cars have a short vehicle range. Unlike the internal combustion-engined vehicles, those powered with electric motors have few if any vehicular emissions. Obviously though, the utility power plants which provide electric power to battery-powered electric cars will be responsible for some type of emission.

The motive engines discussed above are traditionally used for vehicular power. More recent approaches include hybrid electric and fuel-cell power systems. Hybrid electric systems generally make use of internal combustion units to recharge batteries. Fuel-cell systems often require very large hydrogen storage vessels. An alternative to hydrogen storage systems is the use of a continuous partial oxidation or steam reforming on board the vehicle. Our invention is an alternative to these.

Steam Reforming

Petroleum fuels may be reformed using steam to yield hydrogen. The procedure requires two moles of water and heat to decompose thermally the hydrocarbon according to the following reaction:

$$CH_x + 2H_2O \rightarrow CO_2 + (x/2+2)H_2$$

Using methane as a feedstock, x=4 and the theoretical hydrogen yield is four moles of hydrogen for each mole of methane fed to a reactor. The reaction is endothermic so that the theoretical heat required is 61.8 Kcal/gm-mole, the heat of combustion of methane is 191 Kcal/gm-mole, and the hydrogen efficiency is 91%. At equilibrium conditions, only about 2.55 moles of hydrogen is produced and therefore the hydrogen efficiency is reduced to 76%.

For a typical liquid petroleum fuel such as heptane, x=2.29, the theoretical hydrogen yield is 3.15 moles of hydrogen per mole of heptane, the heat required is 53.8 Kcal/gm-mole, the heat of combustion of heptane is 153 Kcal/gm-mole, and the hydrogen efficiency is 88%. However, at equilibrium conditions, the hydrogen production is reduced to 2.6 moles, and the corresponding hydrogen efficiency is reduced to 74%. This approach results in the highest hydrogen efficiency since some of the hydrogen is supplied by the steam which is broken down in the reforming reaction.

Partial Oxidation

In the partial oxidation of petroleum fuels, a portion of the fuel is burned to provide heat to decompose the fuel and water in an oxygen-starved environment, thus:

$$CH_x + (1.5 - x/8)H_2O + \frac{1}{4}(1 + x/4)H_2 \rightarrow CO_2 + (1.5 + 3x/8)H_2 + \text{heat}$$

For methane:

$$CH_4 + H_2O + \tfrac{1}{2}O_2 \rightarrow CO_2 + 3H_2 + 29.48 \text{ Kcal/gm-mole}$$

The theoretical hydrogen efficiency for methane is 78% and at equilibrium conditions expected hydrogen efficiency at 64%. Using heptane as a feedstock, x=2.29 and the resulting equation is:

$$CH_{2.29} + 1.21H_2O + 0.39O_2 \rightarrow CO_2 + 2.36H_2 + 25.1 \text{ Kcal/gm-mole}$$

The theoretical hydrogen efficiency is 77% and at equilibrium the hydrogen efficiency falls to 60%.

Partial oxidation has a moderately high hydrogen efficiency since some portion of the hydrogen contained in the feedstock is combusted in this reaction scheme.

Pyrolysis

Pyrolysis is the direct thermal decomposition of petroleum according to the following equation:

$$CH_x + \text{heat} \rightarrow C + x/2 H_2$$

For methane it is simply:

$$CH_4 + \text{heat} \rightarrow C + 2H_2$$

The heat required to decompose methane is about 18.9 Kcal/gm-mole and the corresponding theoretical hydrogen efficiency is 55%. Under equilibrium conditions, one could expect to extract about 90% of the hydrogen contained in the methane and the hydrogen efficiency is therefore reduced to 50%.

Using heptane, the reaction becomes the following:

$$CH_{2.29} + \text{heat} \rightarrow C + 1.14 H_2$$

The heat required in this reaction is 18 Kcal/gm-mole and the theoretical efficiency based on hydrogen is 40%. Experiments have shown that 90% of hydrogen can be recovered, thus reducing the overall hydrogen efficiency to 36%.

The pyrolysis process has the lowest hydrogen efficiency since only the hydrogen contained in hydrocarbon feedstock is available. It, however, has the advantage of being free of carbon monoxide and carbon dioxide gases which require further processing before utilization by fuel cells. Further, carbon monoxide is a reactive pollutant which must be combusted in an oxygen-rich atmosphere to meet the requirements for various transportation applications.

With the background stated above: U.S. Pat. No. 4,070,993 (to Chen) describes a process for cracking a low octane fuel to produce a gaseous product of substantially higher octane value which is then fed directly to an internal combustion engine. The partially hydrogenated gas generally contains gases of $C_5^-$ for use in the engine. Conversion is shown in the examples to be 60% or greater. The remainder is presumably coke on the catalyst.

U.S. Pat. No. 4,862,836 (to Chen et al.) shows a similar process but one involving a dual converter involving a partial combustion of a fuel in the presence of oxygen. This partial combustion is necessary to sustain the heat required by the conversion, which conversion is apparently a partial oxidation or other similar reaction.

Other systems for reforming fuel prior to its combustion in an internal combustion engine are shown in variety of patents. For instance, U.S. Pat. No. 4,143,620 (Noguchi et al.) shows a fuel reforming system in which the catalyst used to reform the fuel is placed in heat exchange with the exhaust gas emanating from the engine. The fuel is preferably methanol. The methanol is partially sent to a carburetor where it is ignited in conjunction with a hydrogen-rich fuel stream which is produced by reforming the remainder of the methanol.

U.S. Pat. No. 4,147,136 (to Noguchi et al.) show a similar process but one in which the feedstock is a hydrocarbon fuel. The process utilizes a fuel reforming system which burns a portion of its hydrocarbon fuelstock to maintain a reforming reaction vessel at an appropriately high temperature. The remainder of the fuel is fed to that reforming reactor vessel. The resulting reformed gaseous mixture contains a substantial amount of hydrogen. The inclusion of hydrogen in the reformed gaseous mixture is said to facilitate a reliable ignition and combustion of that reformed mixture of the reformed mixture along with a non-reformed hydrocarbon fuel. This process allows the use of a lean air-to-fuel ratio which is further said to result in the lowering of HC, CO, and $NO_x$ emissions.

U.S. Pat. No. 4,147,142 (to Little et al.) describes a procedure for both modifying the physical state and chemical composition of a fuel prior to its combustion. The modification step includes vaporization of the liquid fuel and use of the heat from the engine's exhaust also to thermally crack the fuel passing to the combustion process.

U.S. Pat. No. 4,185,966 (to Frie et al.) shows a device for reforming a vaporized or atomized, liquid, higher hydrocarbon stream with an oxygen containing gas at an elevated temperature to form a gas mixture containing methane, carbon monoxide, and hydrogen. The product of the reformed gas generator is mixed with an exhaust stream and fed to an internal combustion engine.

U.S. Pat. No. 4,722,303 (to Leonhard) shows a method for using the heat of the exhaust gas to decompose methanol feedstock into hydrogen and carbon monoxide. This decomposed gas is injected directly into an internal combustion engine and, it is said, that by doing so towards the end of the compression cycle, an overall efficiency increase of 30% (as compared to a Diesel cycle engine) may be obtained.

U.S. Pat. No. 4,735,186 (to Parsons) also describes the procedure for cracking hydrocarbon fuel and passing it, along with a portion of the exhaust gas produced by combustion, along to the combustion chamber in an internal combustion engine.

U.S. Pat. No. 5,343,699 (to McAlister) describes using waste heat rejected from the heat engine to aid in generating a carbon monoxide and hydrogen rich fuel for a heat engine. The hydrocarbon fuel is combined with an oxygen donor to produce a fuel with a thermal value that is greater than the original fuel.

None of these procedures show partial or total pyrolysis of a hydrocarbon fuel, a separate conversion of the hydrogen stream formed by that pyrolysis in a fuel cell to produce electrical energy, and the simultaneous conversion of carbon coke to a mixture of carbon monoxide and hydrogen for use in a combustion engine.

Other procedures are known for the production of hydrogen which is further used as fuel in an internal combustion engine.

U.S. Pat. No. 4,362,137 (to O'Hare) shows an alternative fuel mixture, ignition, and an induction system in which an increased burning rate is achieved by directing conventional fuel through a pyrolysis cell and a cooler on its way to the combustion chamber. During such a passage, the fuel is partially stripped of its hydrogen and the so-stripped fuel is passed into the cell during the compression cycle.

A somewhat exotic process is shown in U.S. Pat. No. 4,597,363 (to Emelock) in which oxalic acid, dispersed glycerol, and formic acid is heated at a higher temperature to form hydrogen. The hydrogen is used directly in the fuel cell to produce electricity or as fuel for an internal combustion engine.

Again, none of these procedures show the central concept of using the partial or total pyrolysis of a hydrocarbon fuel to produce a hydrogen stream which is used in an electrical fuel cell to produce electricity and to use the remaining carbon coke to produce carbon monoxide and hydrogen fuel in an internal or external combustion engine.

SUMMARY OF THE INVENTION

This invention deals with a procedure for generating power and a hybrid power generating system of interrelated components used to practice that procedure. The procedure involves partial or total pyrolysis, either by thermal or catalytic means, of a liquid or gaseous hydrocarbon to produce a gaseous stream containing hydrogen and to produce an intermediate fuel stream, which is at least partially de-hydrogenated. The intermediate stream may be gaseous, liquid, or under the preferred total pyrolysis, may even be hydrogen-free and hence a solid carbon coke deposited on the catalyst bed. The hydrogen-containing stream (or hydrogen-rich gas stream) may be fed to a fuel cell to produce electric energy. The electric energy so-produced in turn may be used in an electric motor to produce mechanical power.

The intermediate fuel stream may be passed to an internal or external combustion engine to produce mechanical power. Under total pyrolysis, the carbonaceous solid is reacted with an oxygen-containing stream such as steam, carbon dioxide or other suitable gas or mixture thereof to form an intermediate fuel stream which is generally a gaseous mixture containing significant carbon monoxide. When steam is used as the process gas, a mixture of carbon monoxide and hydrogen is produced. The intermediate fuel stream may also contain some fraction of the gas used to convert the carbon coke into carbon dioxide. This intermediate gas is fed to a high efficiency internal or external engine to produce mechanical work. We believe that our hybrid system offers the achievable goal of a superior fuel economy at least twice that provided by conventional internal combustion engines. This is particularly true when the intermediate fuel stream is used in an efficient heat engine, such as an Atkinson cycle engine or a Diesel cycle engine.

The pyrolysis reactor, which may be thermal or catalytic, is operated in such a way that maximizes (preferably over 80%) the release of the $H_2$ contained in the feedstock hydrocarbon. The remaining carbon coke is converted to a carbon monoxide-rich gas by processing with steam, carbon dioxide, or other suitable gas or mixture thereof that may then be fed to the combustion heat engine. The use of pyrolysis or cracking to produce a hydrogen-rich stream avoids complications found in other known processes such as partial oxidation. Since the carbon oxides produced by these other processes in combination with the desired hydrogen are minimized by our pyrolysis/cracking step, a very simple carbon oxide removal step such as methanization on the $H_2$-rich stream may be used for final hydrogen clean-up prior to use in the fuel cell. The $H_2$-rich stream may then be fed to a fuel cell without appreciable further treatment.

Use of the inventive procedure permits use of many different fuels. Although hydrogen-rich hydrocarbons such as alkanes and branched alkanes are specially suitable as feedstocks for this process, any typical, commercial fuel is suitable, e.g., gasolines, gasoline blending components such as alkylates, crude distillation products such as kerosene, and the like. Depending on the catalyst, small amounts of CO may be formed during pyrolysis. A simple methanation step may be used to reduce the level of CO from a small percentage (a few parts per hundred) to a level of a few parts per million, well within acceptable limits for fuel cell use. A small amount of ethylene or methane in the $H_2$-rich stream is not detrimental.

The intermediate carbon monoxide-rich gaseous fuel remains quite suitable for use in wide variety of internal and external combustion heat engines. However, it is most preferred that the carbon monoxide-rich gaseous fuel be used with a heat engine, preferably one which is a combustion engine and is highly efficient at low loads. One such engine is an Atkinson cycle engine. Another desirable engine is a diesel engine.

BRIEF DESCRIPTION OF THE DRAWINGS

FIG. 10A shows a partial cutaway (top view) of a reactor suitable for use with a single cylinder of an internal combustion engine in this invention.

DESCRIPTION OF THE INVENTION

As noted above, this invention is both a procedure for generation of mechanical power and a hybrid fuel-cell combustion engine power generation system or unit for practicing that procedure. Central to the invention is the use of a fuel pyrolysis unit for partially or, preferably, totally pyrolyzing a hydrocarbonaceous fuel to form a gaseous stream preferably containing a large amount of hydrogen. The remaining material may be used, as is (when low temperature pyrolysis) as an intermediate fuel stream. When used with the high temperature pyrolysis, the residual solid carbonaceous matter is further reacted to form a gaseous fuel stream or gaseous intermediate fuel stream. The intermediate fuel stream may contain gaseous, liquid, and solid components. The procedure also uses a fuel cell for converting at least a portion of the $H_2$ in the gaseous fuel stream to electrical current which current may be subsequently used in an electrical conversion unit such as a rotary or a linear electric motor. The intermediate fuel stream may be used in a combustion engine which also produces a mechanical motion. This combination of partial or total pyrolysis reactor, fuel cell, electric motor, and combustion engine results in a power unit capable of high thermal conversion efficiencies.

The heat engine used in this electrical power generation system may be used directly to power the drive wheels of a vehicle or may be used to run an electrical generator for the production of electrical power to run a single electrical motor.

The preferred total pyrolysis procedure typically produces only gasses for use within the unit itself. Hydrogen gas is produced during pyrolysis of the input hydrocarbon fuel. A carbon-monoxide-rich gas intermediate fuel is produced by processing the carbon coke residue formed on the catalyst bed during pyrolysis with an oxygen carrying gas (such as steam, carbon dioxide or other suitable oxygen-carrying gas or mixture thereof). These oxygen carrying gases may be constituents of the exhaust gas from the engine and available for this de-coking process upon suitable filtering. This intermediate gaseous fuel is used in a high efficiency internal or external combustion engine.

Pyrolysis Reactor

Central to this invention is a reactor for the dissociation of feedstock hydrocarbonaceous material. The reactor may be either thermal or catalytic in nature. Thermal pyrolysis reactors are well known in the art. Various catalytic pyrolysis and low temperature cracking reactors are similarly well known.

In essence, the reactor is one which dissociates hydrogen from a hydrocarbon fuel feedstock and separates the hydrogen gas thus-produced into a separate stream (the so-called "hydrogen-rich stream") for further use with the fuel cells discussed below. This reaction is based on pyrolysis: thermal composition in the absence of oxygen. In particular, the inclusion of oxygen into the reactor during pyrolysis is to be avoided. Pyrolysis does require external heat for decomposition. The heat necessary for pyrolysis of suitable hydrocarbon fuels to produce a $H_2$ stream containing most of the available $H_2$ from the input hydrocarbon fuel is a small fraction of the fuels' total heating value (the maximum is 9% for methane; liquid hydrocarbon fuels are much less). This allows the use of a variety of liquid hydrocarbon fuels, e.g., JP-4, JP-5, JP-8, kerosene, diesel, gasoline or other petroleum fuels, while offering redundant energy devices for system reliability and flexibility.

It may be suitable to think of the feed hydrocarbon fuels as sources of high density hydrogen. That is to say that the density of liquid $H_2$ at cryogenic temperatures of 20° Kelvin is in the neighborhood of four $lb/ft^3$. In contrast, compressed natural gas (CNG) has a hydrogen density of two $lb/ft^3$. Most suitable and available liquid fuels such as diesel fuel and gasoline have hydrogen densities of 5.7 to 5.8 $lb/ft^3$. Liquid natural gas (LNG) has a high density of 6.5 $lb/ft^3$. Of course, this procedure and the pyrolysis reactor are typically operated to pyrolyze the liquid or gaseous hydrocarbonaceous fuel feeds in order to utilize at least 20% of the available hydrogen in the fuel in the low temperature pyrolysis regime. More preferably, the reactor is operated at the high temperature regime to maximize, i.e., more than about 80%, even more preferably than about 90%, and most preferably than about 95% of the available hydrogen in the fuel. The remainder of the fuel is obviously still available for subsequent use in the internal combustion engine.

As noted above, the reactor is preferably operated in such a way that the residuum is a substantially $H_2$-free solid, which is reacted, perhaps using swing reactors, to form an intermediate carbon-monoxide-rich gas. The fuel may be passed to the heat engine portion of the inventive hybrid power system, also as discussed below.

The reactor may use generally low temperatures, for partial or incomplete pyrolysis of the hydrocarbon fuels so to produce the intermediate or residual fuel and high purity hydrogen gas. It is inevitable, perhaps, that the hydrogen gas will contain a small quantity of methane or other short chain hydrocarbons. We have found that by operating the reactor at temperatures below 600° C. on a liquid fuel, the products produced fall within the general criteria described above. This low temperature operation also minimizes the amount of carbon that accumulates in the reactor and minimizes the need for later decoking operations. For example, hydrocarbon such as pentane (a low octane component of gasoline) may be pyrolyzed according to the following formula:

$$C_5H_{12} \rightarrow C_2H_4 + CH_4 + 2H_2 + 2C$$

or, perhaps at lower severity:

$$C_5H_{12} \rightarrow (1-x)C_5H_{10} + (x/2)C_2H_4 + (x/2)C_2H_6 + (x)CH_4 + (3/2x)H_2.$$

Similarly for octane, at high severity:

$$C_8H_{18} \rightarrow C_4H_8 + CH_4 + 3H_2 + 3C$$

The ratios of each of the noted products are simply dependent upon the temperature of reaction. As discussed below, we have found that by maintaining the temperature for pentane at a temperature below 550 to 600° C. that the pyrolysis is quite simple and produces high amounts of pentene ($C_5H_{10}$) and hydrogen. Cracking may also take place and the reaction may proceed so that a small portion of the pentane cracks to a non-condensable gas containing ethene, methane and a residual liquid that is mainly pentene. As the temperature is increased, the mid-chain cracking reactions begin to become more predominant, therefore producing more ethylene and ethane along with the fragment methane. These cracking reactions take place at the detriment of the production of hydrogen. At suitably low temperatures, no (or nearly no) elemental carbon is produced. These reactions are thermodynamically limited and the endpoints are typically easily calculable for such simple systems using minimization of the Gibbs free energy function.

We also contemplate the use of gaseous feedstocks to the pyrolysis reactor and when using such materials, it is apparent that higher temperatures are suitable. For instance, temperatures up to 950° C. (or higher) may be chosen for feedstocks such as methane or ethane. It should also be apparent that the product of such a reaction may contain a significant amount of particulate carbon.

Catalysts may be used to accelerate the rate of pyrolysis and in some instances accelerate the selection of products to non-equilibrium product compositions. The catalysts which may be placed in the hydrocarbonaceous fuel pyrolysis unit include solid materials comprising one or more of the metals selected from Group 4B (Ti, Zr, Hf), 5B (V, Nb, Ta), 6B (Cr, Mo, W), 7B (Mn, Tc, Re), 8B (Fe, Co, Ni, Ru, Rh, Pd, Os, Ir, Pt), the Lanthanide Series (Ce, Pr, Nd, Pm, Sm, Eu, Gd, Tb, Dy, Ho, Er, Tm, Yb, Lu) of the Periodic Table. It is desirable to place these materials on a refractory substrate such as alumina, chromia, zirconia, silica-alumina, magnesia, silica-magnesia, thoria, beryllia, titania, or the like. Other matrix materials such as clays, silicas or other naturally occurring materials are also suitable. Montmorillonite and kaolins are also known supports. Obviously it is desirable that these materials be provided with a significant amount of porosity.

Zeolitic materials may be used either as shape selective supports or simply as porous materials depending upon the cage sizes inherent in those materials. A selection of potentially suitable zeolites is shown in U.S. Pat. No. 4,862,836, to Chen et al, mentioned above.

Branched alkanes are especially suitable for use as feedstocks to this procedure because of their high hydrogen density. Pentane was mentioned above as a component included in gasoline. Obviously other materials typically found in diesel fuel mixes and gasolines are also suitable.

Transition metals or Group VIII metals on supports such as chromia or alumina are currently preferred.

Examples of Partial Pyrolysis at Low Temperature where the Intermediate Fuel is a Liquid Examples of a product mix made using catalytic pyrolysis reactors and gross hydrogen reaction rate are shown in the following examples. In each instance, a fixed bed reactor containing the catalyst was heated to temperature noted in the attendant figures and the stream of pentane was introduced. The content of the product stream was also measured.

Figure 1:
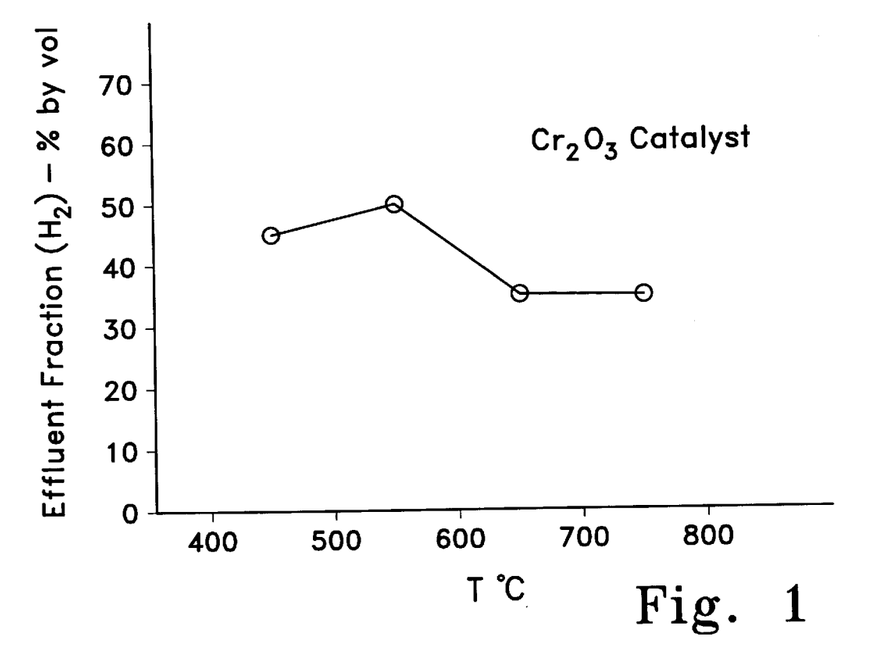
FIG. 1 shows a graph of the relationship between products and temperature of reaction for a specific hydrocarbon feedstock and catalyst.

The catalyst used in the run shown in FIG. 1 was a simple chromia catalyst. It should be noted that the effluent fraction of the hydrogen was highest at a temperature below about –650° C. Very little coking was noted in that temperature range. The other reaction products included ethylene, ethane, and methane.

Figure 2:
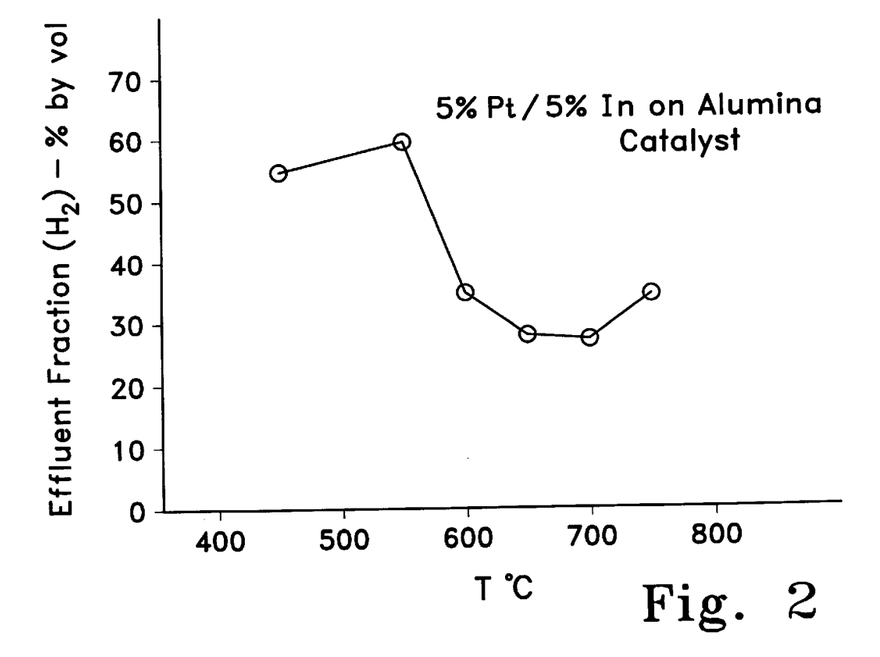
FIG. 2 shows a graph of the relationship between products and temperature of reaction for a specific hydrocarbon feedstock and catalyst.

Similarly, the data shown in FIG. 2 show that for a catalyst made up of a 5% platinum and a 5% indium on an alumina support, the results are quite similar. The hydrogen percentage in the effluent gas is highest at temperatures which are modest. Again, the other reaction products included ethylene, ethane, and methane.

Figure 3:
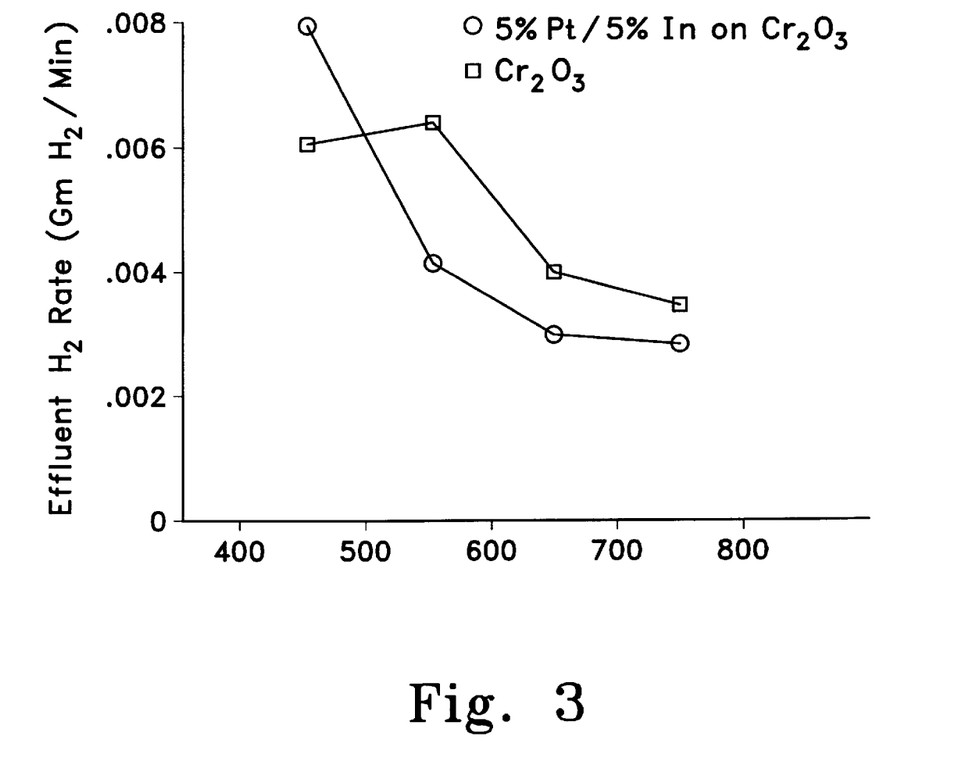
FIG. 3 shows a graph of the relationship between $H_2$ production rate and temperature of reaction for a specific hydrocarbon feedstock and catalyst.

Finally, FIG. 3 shows that the hydrogen production rate (in grams of hydrogen per minute) is, perhaps, expectedly higher at the lower temperature range.

Although a catalyst permits the use of smaller reaction vessels and have, therefore, quite desirable attributes in their use in a vehicle, simple thermal pyrolysis reactors are also quite useful. The layout of a pyrolysis reactor is not seen as particularly critical. It should involve simply passage of heat from the heat source as discussed above, preferably through the use of indirect heat exchange. Again, the temperature should be maintained in the temperature range of 350° to 650° C., more preferable 450 to 575° C., and most preferably 500 to 550° C. to achieve optimum amounts of liquid intermediate products and production of hydrogen from alkyl-based fuel stocks. Higher temperatures may be desirable where the feedstock is gaseous. The ancillary equipment associated with reactor need not be particularly complicated. Since the temperature reaction is significantly higher than most of the boiling points for the liquids introduced into the reactor, some means for condensation of the residual, partially de-hydrogenated hydrocarbon reactor effluent is desired. Such condensation could take place through the use of feed-effluent heat exchangers. Baffling to prevent carryover of liquid into the hydrogen stream is obviously a desirable aspect. The hydrogen stream is thereafter taken to the fuel cell noted below, which fuel cell is generally sized for production rate of hydrogen chosen as a design basis for the particular fuel involved. This need not be so, however, since in situations where the hydrogen production outstrips the ability of the fuel cell to accept the hydrogen produced by the pyrolysis reactor, the hydrogen may be simply diverted to the heat engine for use as a thermal fuel.

Conversely, hydrogen may be extracted at a fairly constant rate and stored in a temporary storage vessel, such as uses a metal hydride. Other suitable storage methods may also be used. The thus-stored hydrogen may then be released to the fuel cell at a rate necessary to meet the power demands of the system by the fuel cell.

It is within the scope of this invention to separate products such as methane and ethylene and higher chain length hydrocarbonaceous materials from the hydrogen stream prior to their entrance to the fuel cell if needed or desired. Such separation may be desired since fuel cell efficiency can decrease significantly if nonreactive inerts such as nitrogen and methane are included in the feed hydrogen. On the other hand, if modest amounts of methane may be tolerated in the fuel cell, the fuel cell itself may act as a concentrator for the methane and its subsequent recycle back to the heat engine discussed below.

As a final point, because of the sublimely mixed hydrocarbons found in fuels such as gasoline and diesel fuel, some amount of carbonaceous material or coke will be found over time in the pyrolysis reactor. Typical coke precursors might be alkenes, which are somewhat hydrogen deficient prior to their passage into the pyrolysis reactor. But whatever the source, the reactor should be provided with some means for decoking the reactor. Typically, this may be as simple as a port for introduction of air into the reactor at high temperature so to burn off the coke. More elegant solutions include the introduction of steam, carbon dioxide, oxygen, or some mixture thereof so to perform a partial oxidation of the carbon into carbon monoxide and hydrogen for use in the heat engine as a fuel. Some thought should be given for each individual design to determine whether the added complication of partial oxidation as a regeneration step is needed. Typically, the controlling factor will be the nature of the fuels involved.

Examples of Total Pyrolysis at Medium to High Temperatures where the Intermediate Fuel is a Carbon Monoxide-rich Gas The previous section explained low temperature operation where only a fraction of the available hydrogen, say 20%, is liberated from the fuel for use in the fuel cell. The secondary fuel is a slightly de-hydrogenated hydrocarbon that can be directly input to an engine.

Under medium to high temperature operation, the objective is to extract a maximum percentage of the hydrogen available in the petroleum fuel for use in the fuel cell. We also use the term "totally" removing or dehydrogenating feed hydrocarbonaceous fuel. By that term we mean that at least 80% of the hydrogen present in the feed hydrocarbonaceous fuel will be removed in the form of an $H_2$ gas from that feed stock. The higher temperature operation results in the carbon from the petroleum fuel being deposited on the catalyst bed when the hydrogen is liberated. When a sufficient amount of carbon has been deposited on the catalyst such that the rate of hydrogen liberation from the fuel is diminished, the operation of the fuel processor is switched to a de-coking mode to generate a gaseous fuel for the engine. De-coking is accomplished by introducing an oxygen carrying gas such as steam, carbon dioxide, or other suitable gas or combinations thereof into the chamber containing the hot catalyst bed. The hot carbon reacts with the oxygen carrying gas or gasses to generate a gaseous fuel rich in carbon monoxide. This fuel is then introduced to the engine. A heat exchanger may be used to warm the oxygen carrying gas prior to introducing it to the catalyst bed and thereby cool the carbon monoxide-rich gas prior to its introduction to the engine.

In the high temperature pyrolysis variation, the pyrolysis temperature should be maintained in the temperature range of 650° C. to 1,200° C., more preferable 750 to 900° C., and most preferably 800 to 850° C. to achieve hydrogen production. The preferred temperature is usually dependent upon the choice of catalyst. Of course, if thermal pyrolysis is used, the choice is more likely based upon the equilibrium thermodynamics. Higher temperatures may be desirable to maximize hydrogen production. However, if a larger fraction of methane can be tolerated in the hydrogen stream, somewhat lower temperatures may be desirable.

A petroleum feedstock which is liquid at room temperature is preferably used in the high temperature pyrolysis variation of this invention.

Figure 4:
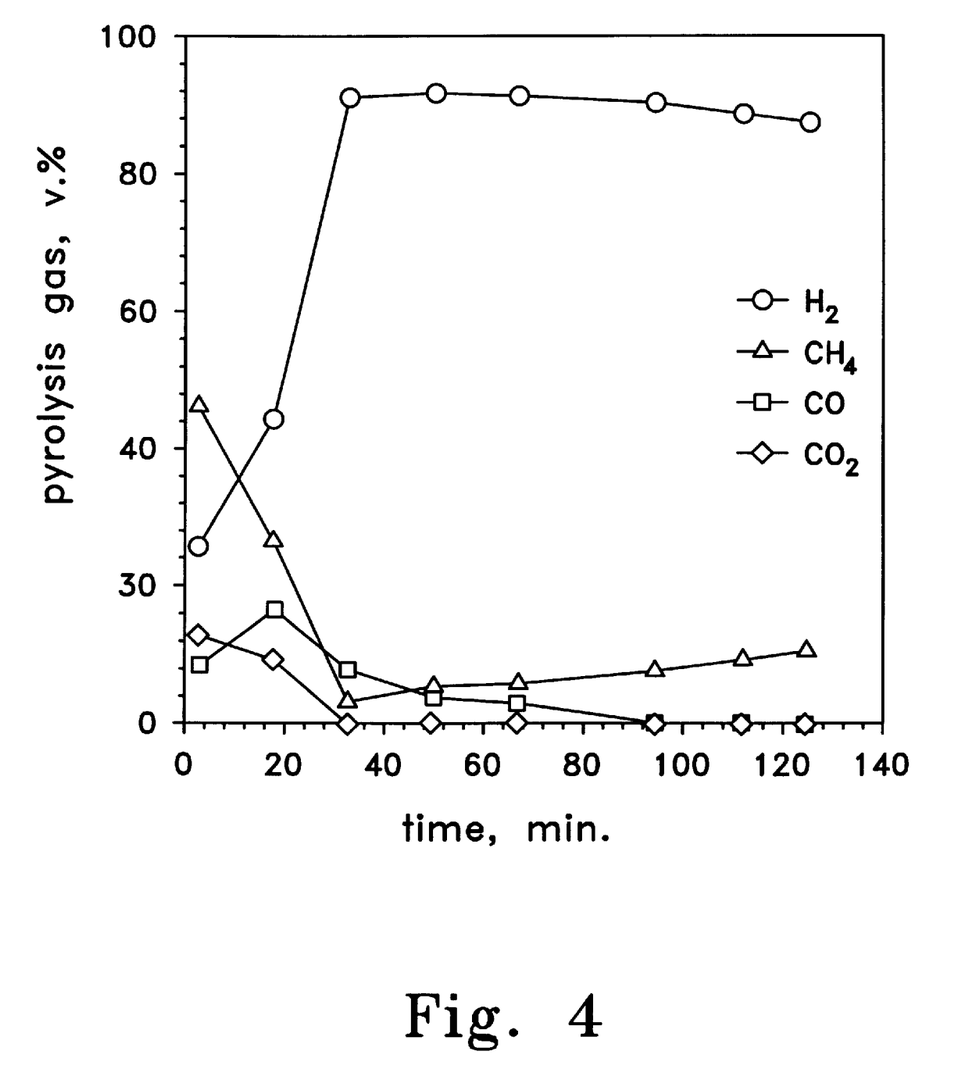
FIG. 4 shows a graph of pyrolysis of methane over iron catalyst at 850° C. verses time.

FIG. 4 is a diagram showing laboratory data for pyrolysis of methane over an iron catalyst at 850° C. Notice the high content of hydrogen gas after the initial conditioning period of about 40 minutes where iron oxide ($Fe_2O_3$) is reduced to elemental iron. Both carbon monoxide and carbon dioxide concentrations are high (about 10%) while the reduction of iron is taking place. Also notice that the hydrogen content gradually declines after 32 minutes or so as carbon accumulates on the catalyst while the methane content starts to increase, and the carbon monoxide and carbon dioxide both drop to zero after about 90 minutes of operation.

Figure 5:
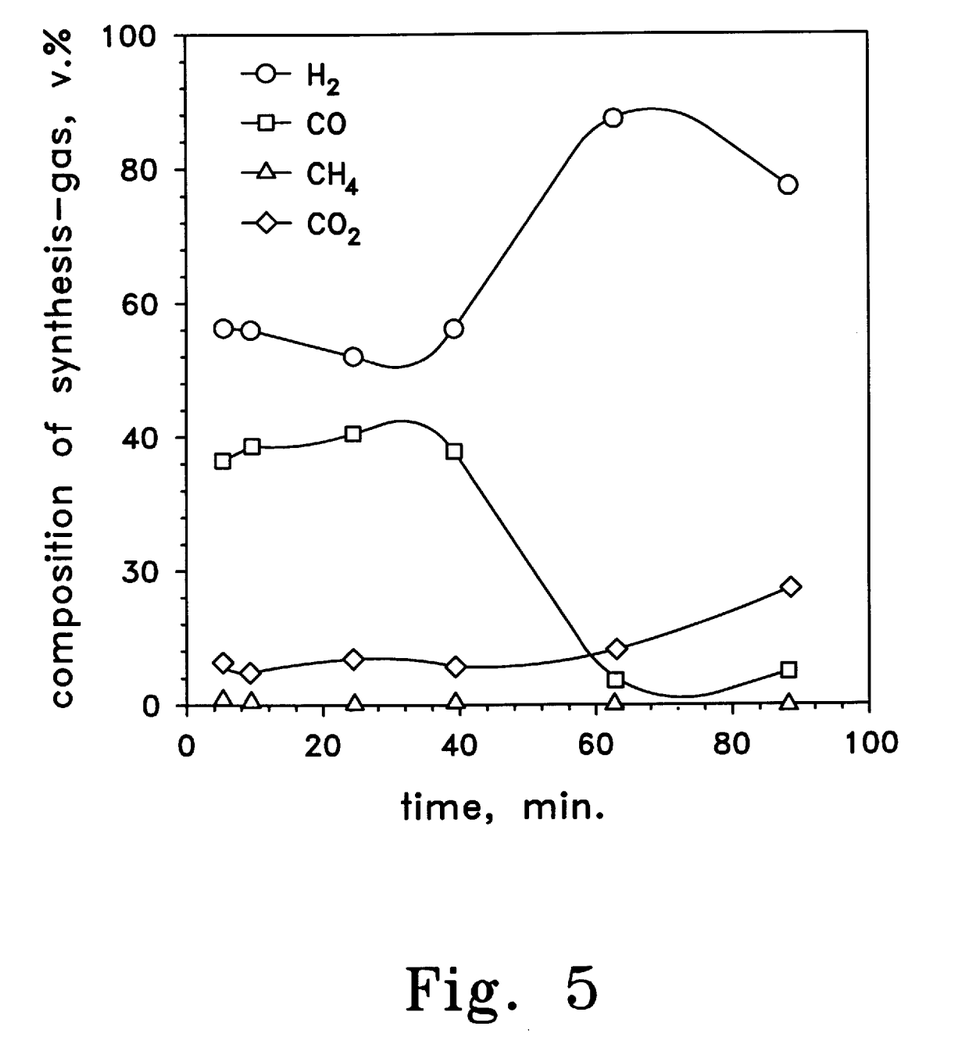
FIG. 5 shows a graph of the output gas from the gasification of carbon coke by steam over an iron catalyst at 900° C.

FIG. 5 is a diagram showing laboratory data for de-coking the hot carbon from the catalyst bed using steam over an iron catalyst at 900° C. Notice that over the initial 45 minutes or so, the hydrogen content is approximately 55% by volume and the carbon monoxide content is approximately 40%. Thus, this fuel is expected to burn quite cleanly in the engine.

Figure 6:
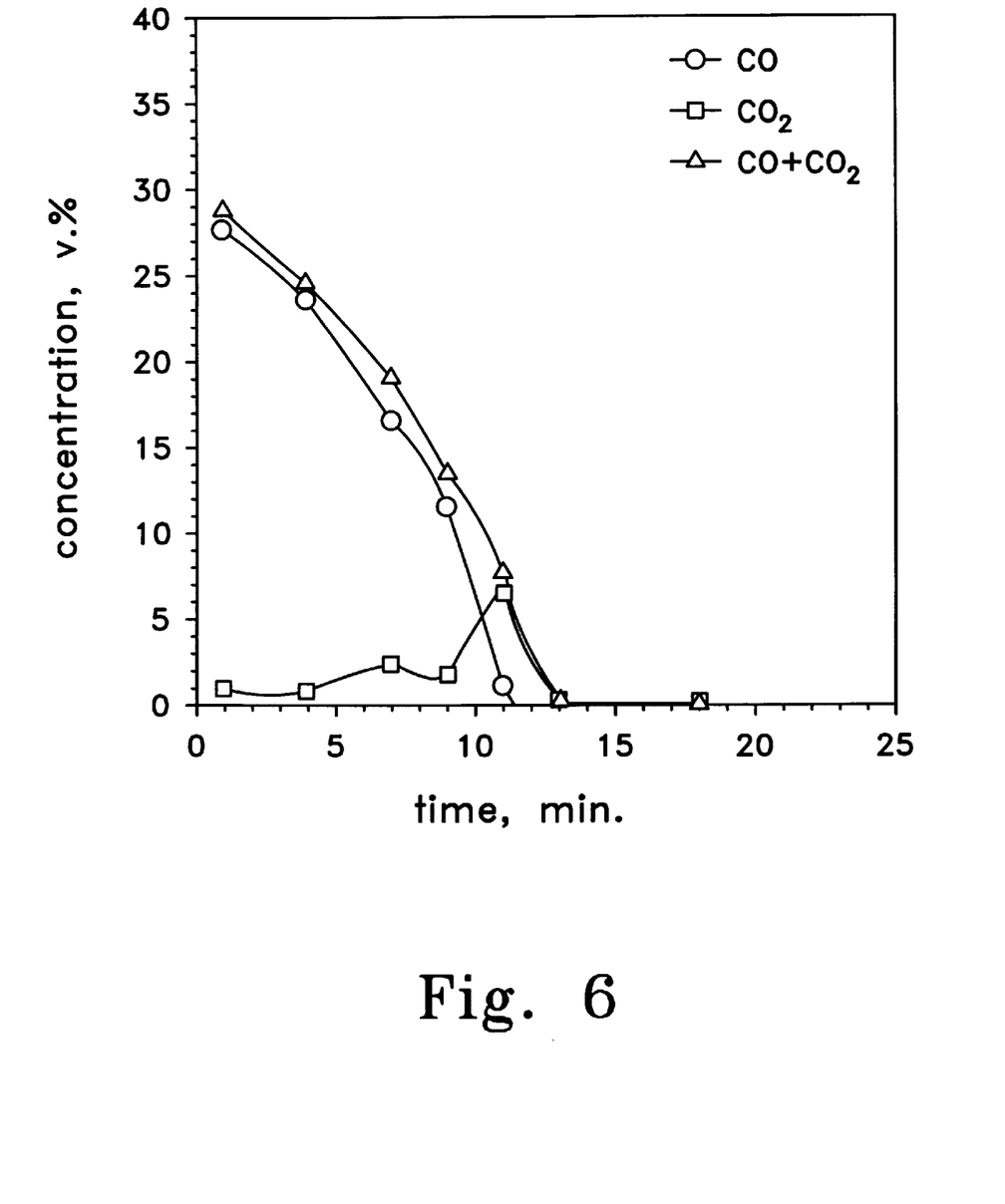
FIG. 6 shows a graph of the concentration of output gas for air de-coking of an iron catalyst at 850° C.
Figure 7:
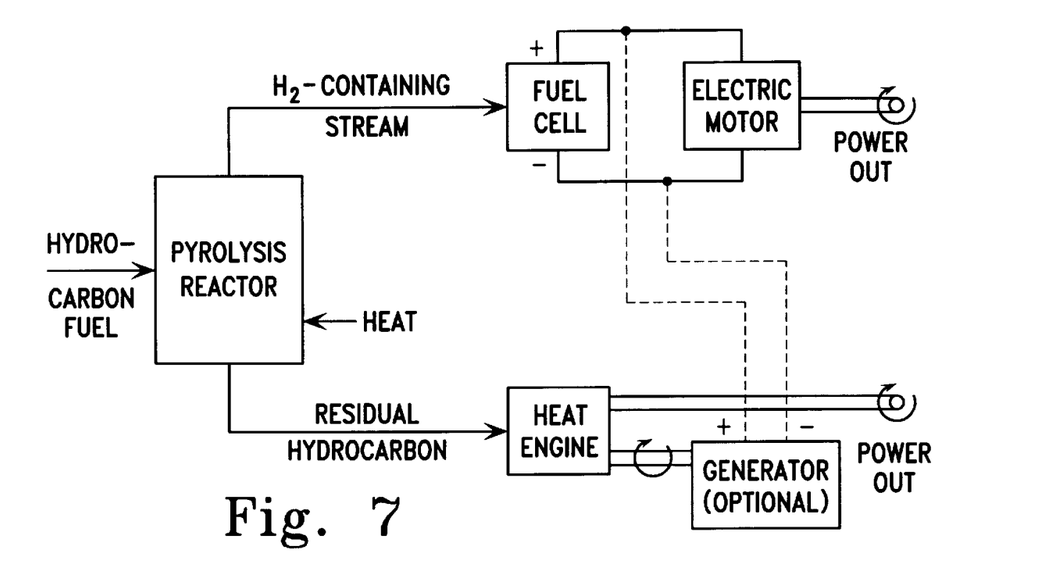
FIG. 7 shows schematic diagram for a hybrid power unit made according to the invention.

FIG. 6 shows laboratory data when air is used to de-coke the carbon from an iron catalyst bed with an initial temperature of 850° C. Note the initial high content of carbon monoxide gas and the increase in carbon dioxide at the twelve minute mark as the carbon monoxide approaches zero. De-coking the carbon with air at 850° C. produces carbon monoxide gas suitable for use in the engine while also generating process heat to drive the endothermic reaction of fuel pyrolysis. As the temperature decreases below 850° C., the percentage of the carbon monoxide decreases while the percentage of carbon dioxide increases. At temperatures below 600° C., de-coking with air generates primarily carbon dioxide, a non-combustible gas Process Variations FIG. 7 is a schematic outline of the process using a single stage of low temperature pyrolysis. As is apparent from the Figure, a hydrocarbonaceous fuel, preferably one with a high hydrogen content (H/C ratio of 1.5:1–about 3:1) is fed to the pyrolysis reactor as discussed above. The hydrogen containing stream (perhaps containing a modest amount of methane) is introduced to the fuel cell where electricity is generated and may be fed then to electric motor. The residual hydrocarbon stream containing less bonded hydrogen is then fed to the heat engine where such fuel is used to power the engine. The heat engine may be either tied to an optional generator and the electrical power from that generator used to power the electrical motor in conjunction with the electricity emanating from the fuel cell or the heat engine may be used directly as a prime mover for the vehicle in question.

Figure 8:
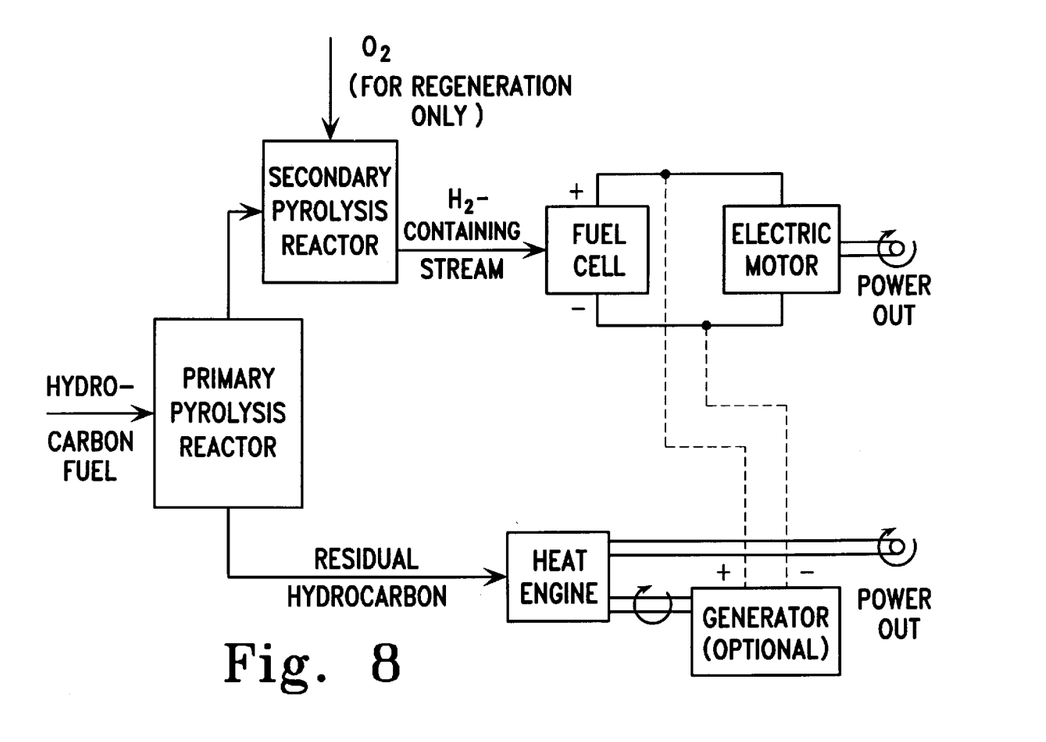
FIG. 8 shows an alternative schematic diagram for a hybrid power unit made according to the invention. This variation uses a multi-stage pyrolysis reaction.

FIG. 8 shows a variation of this invention in which the fuel cell, electric motor, heat engine, and generator (optional) are used as discussed above in conjunction with FIG. 7. In this variation, the primary pyrolysis reactor may be operated at a slightly higher temperature so to cause a higher percentage of cracking reactions. In this way, although the amount of non-condensable hydrocarbons (methane, ethane, ethylene, etc.) found in the hydrogen stream is increased, the overall amount of hydrogen for the two stage pyrolysis is similarly increased. In this variation, the gas stream from the primary pyrolysis reactor is subjected to a second pyrolysis reaction. The secondary pyrolysis reaction may be run at a higher temperature, e.g., 600° C.–900° C. or higher, perhaps to 700° C., so to further pyrolyze the hydrocarbons and strip hydrogen therefrom. This, of course, means that some carbon is left as coke in the secondary pyrolysis reactor. At some time, the secondary pyrolysis reactor must be taken off-line for decoking. The decoking step may take the form of a simple oxidation (or "burn") or a partial oxidation as mentioned above. Since the secondary pyrolysis reactor will likely contain more carbon than the variation shown in FIG. 7, a partial oxidation reaction may be desirable.

Figure 9:
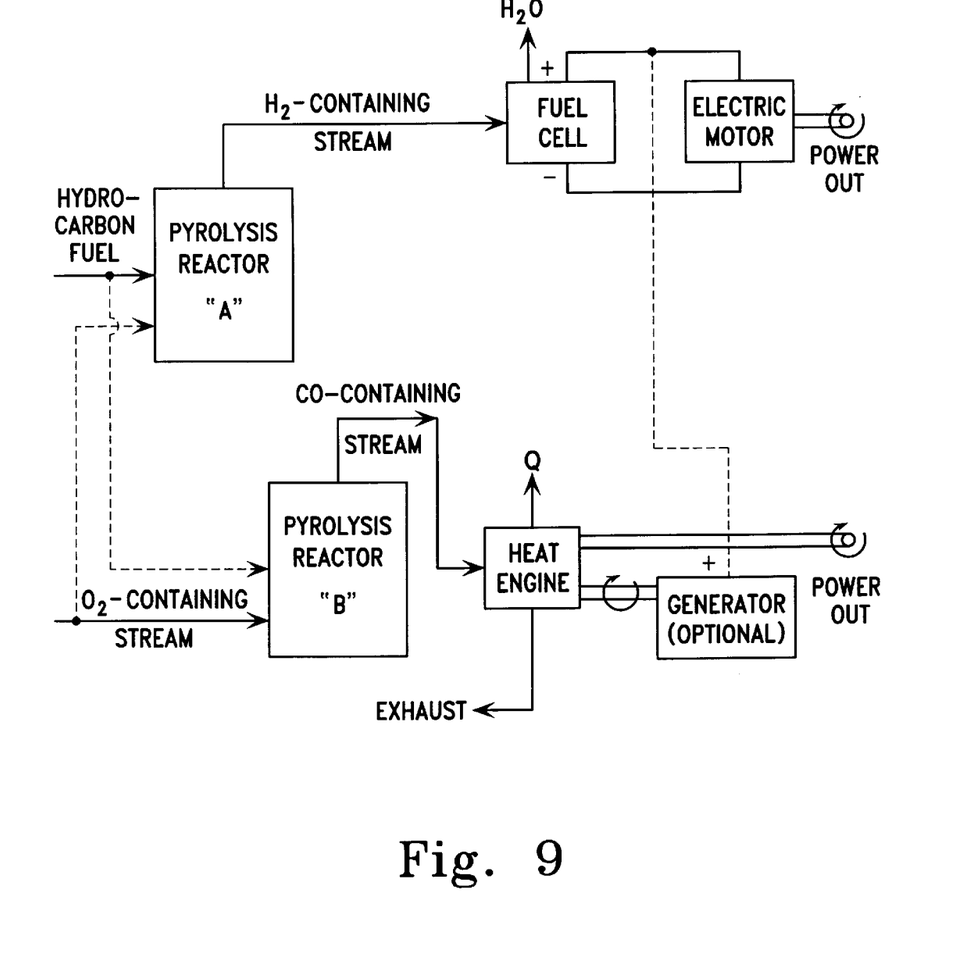
FIG. 9 shows another preferred schematic diagram for a hybrid power unit made according to the invention. This variation uses a single stage high temperature pyrolysis reaction.

FIG. 9 shows a preferred variation of this invention in which the fuel cell, electric motor, heat engine, and generator (optional) are used as discussed above in conjunction with FIG. 7. In this variation, it may be desirable to use two or more pyrolysis reactors, as shown in FIG. 9, as reactors "A" and "B". In this variation, the primary pyrolysis reactor ("A") is operated at a very high temperature, i.e., 650° C.–1200° C. or higher, more preferably 750° C. to 900° C., and most preferably 800° C. to 850° C., to cause an exceptionally high percentage of cracking reactions. The amount of hydrogen in the hydrogen stream is increased and substantial when compared to the earlier variations. The hydrogen stream is sent to the fuel cell. The fuel cell reacts $O_2$ with the produced hydrogen to form a water stream. The water may be recycled to other sites in the process, e.g., to the regenerating pyrolysis reactor or to the active pyrolysis reactor as coolant.

Meanwhile, the other primary pyrolysis reactor ("B") is fed with an $O_2$-containing stream, e.g., methanol, $O_2$, $H_2O$, etc. to form a CO-containing stream. This stream is sent to a heat engine much in the same way as noted above. The heat engine produces an exhaust stream which may be partially used as an element of the $O_2$-containing stream. The heat engine will produce an amount of heat ("Q") which may be used via heat exchange to, e.g., preheat the hydrocarbonaceous feed to the active pyrolysis reactor or for other such purposes. As may be found in FIG. 9, the two pyrolysis reactors are swapped between active reactor and regeneration duty as appropriate.

Apparatus

Figure 10B:
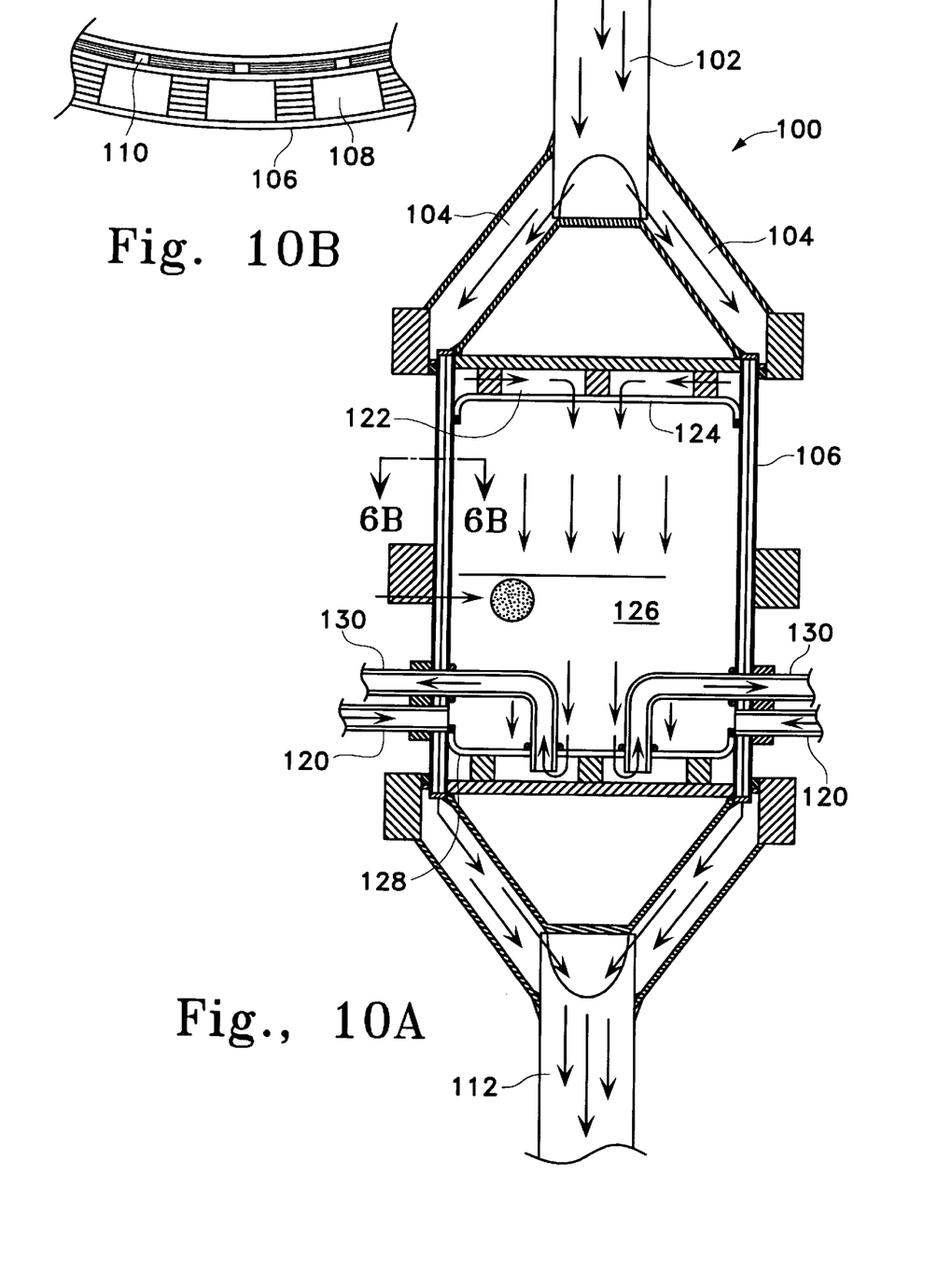
FIG. 10B shows a partial cutaway (top view) of the reactor shown in FIG. 1A.

FIGS. 10A and 10B show, respectively in partial cross-section, the top view of a reactor suitable for use in the pyrolysis/cracking reaction and a section of that reactor's wall. Our belief is that a single reactor per cylinder of the chosen internal combustion device is highly desirable, although obviously such is not a requirement of the invention. One or more such reactors is suitable.

FIG. 10A shows a generalized cross section of a reactor which is highly preferred for use in our inventive process. In essence, the reactor (100) is a packed bed reactor having a distributor and an exterior wall which acts to exchange heat from the internal combustion engine's exhaust both to vaporize the influent hydrocarbon and to heat the pyrolysis catalyst.

Specifically, in this variation, exhaust gas flows in through an inlet line (102) and is split into a number of sub-inlet lines which, in turn, pass to longitudinal passageways in the outer reactor wall (106). Turning for a moment to FIG. 10B, outer reactor wall (106) is shown to have passageways (108) desirably for use in passing the exhaust gas therethrough and smaller passageways (110) for passing the liquid hydrocarbon feed. The liquid hydrocarbon feed is generally completely vaporized in passageways (110) before it enters the reactor bed.

Returning to FIG. 10A, exhaust gas flows through the provided passageways in outer reactor wall (106) and exchanges its heat with the feed hydrocarbon liquid in the smaller passageways (110) and the catalyst bed contained inside reactor wall (106). As is shown in FIG. 10A, the exhaust gas, shown with the heavy arrows in FIG. 10A, is then collected at the bottom of the reactor and sent to an exhaust port for further processing. It should be clear from FIGS. 10A and 10B that the exhaust gas passing through reactor (100) is never in physical contact with the hydrocarbon feed but is instead is only used as a heat source.

The hydrocarbonaceous feed is introduced into reactor (100) via feed lines (120). The hydrocarbon generally flows upward through reactor shell (106) through passageways (110) (shown in FIG. 10B) and is discharged into a plenum (122). Below the plenum is a plate (124) which preferably is used as a distributor plate. The distributor plate (124) is desirable if it is found necessary to distribute the inlet hydrocarbon feed in an equal manner over the catalyst found in catalyst bed volume (126). Obviously, the majority of the reaction will take place within the catalyst bed found in catalyst volume (126). The reacted hydrocarbon then proceeds downwardly through an additional plate (128). Plate (128) may also serve as a catalyst support assembly. The reaction product is then collected exists through reactor exit lines (130). Typically, the reactor outlet will be completely gaseous in nature. It is then taken to a condenser for separation of hydrogen and low molecular hydrocarbons from any resulting liquids or solids.

Fuel Cell-Electric Motor

Fuel cells are well known devices for producing electricity using the power of association from hydrogen with oxygen in producing an electric current. They are known to work best with a stream of hydrogen which is pure. Diluents such as nitrogen, methane and the like have a tendency to lower the efficiency of the fuel cells. This technology is well known and consequently details of its construction are not included here.

Similarly, the construction of electric motors need not be explained in great detail herein. The electric motor needed for this device will obviously be sized for the amount of hydrogen produced, the size of the fuel cell provided, and the size of the vehicle (or other load such as a generator for home power generation or the like) present in the application.

This invention also includes the use of other desirable ancillary equipment such as batteries to store electrical energy over relatively longer periods of time and capacitors to store energy over relatively shorter periods of time.

Heat Engine

Similarly, the heat engine utilized in this procedure is not overly critical although it is highly preferred that one having high thermal efficiency such as one operating in the Atkinson cycle be utilized. Few practical Atkinson cycle engines are currently publicly described but such are preferred. Atkinson cycle engines are discussed in, e.g., SAE Technical Paper 950089, "THE OTTO-ATKINSON CYCLE ENGINE—FUEL ECONOMY AND EMISSIONS RESULTS AND HARDWARE DESIGN", by Boggs et al and SAE Technical Paper 820352, "THE OTTO-ATKINSON ENGINE—A NEW CONCEPT IN AUTOMOTIVE ECONOMY".

Heat engines using internal combustion and involving the Diesel cycle or Otto cycle are also suitable either for driving the wheels on a land vehicle, the propeller on a boat, or (as shown in FIGS. 7–9), the optional generator. External combustion engines such as gas turbine and steam cycle engines are also useful but not as desired.

In summary, this invention is a procedure and device for operating the procedure in which high thermal efficiency may be attained by pyrolyzing and cracking a hydrocarbonaceous fuelstock to produce an intermediate fuelstock and a hydrogen stream. This pyrolysis provides for higher efficiencies than do any of comparable procedures for generating mechanical motion from hydrocarbons.

Finally, it is to be understood that various alterations, modifications, and additions may be introduced into the power generation unit and process of using it as described above without departing from the spirit of the invention as claimed below.

We claim as our invention:

1. A process for generating power comprising the steps of:
   a.) substantially totally pyrolyzing a hydrocarbonaceous feed in a reactor to form a first gaseous stream comprising $H_2$ and a substantially totally dehydrogenated fuel stream,
   b.) introducing at least a part of the first gaseous fuel stream comprising $H_2$ to a fuel cell for producing an electrical current,
   c.) introducing at least a portion of the electrical current from said fuel cell to an electrical conversion unit to produce a first motion,
   d.) introducing an oxygen carrying gas into the reactor following pyrolysis to produce a carbon monoxide-rich gaseous fuel, and
   e.) introducing at least a portion of the carbon monoxide-rich gaseous intermediate fuel stream to a combustion engine to produce a second motion.

2. The process of claim 1 wherein the pyrolyzing step is catalytic and said hydrocarbonaceous fuel is passed over at least one catalyst mass containing a solid catalyst.

3. The process of claim 2 wherein the solid catalyst comprises one or more metals selected from Group 4B (Ti, Zr, Hf), 5B (V, Nb, Ta), 6B (Cr, Mo, W), 7B (Mn, Tc, Re), 8B (Fe, Co, Ni, Ru, Rh, Pd, Os, Ir, Pt), the Lanthanide Series (Ce, Pr, Nd, Pm, Sm, Eu, Gd, Tb, Dy, Ho, Er, Tm, Yb, Lu) of the Periodic Table.

4. The process of claim 3 wherein the solid catalyst comprises said one or more of said metals on a refractory substrate.

5. The process of claim 4 wherein the solid catalyst comprises platinum and indium on alumina, or chromium on alumina, or iron, or other suitable catalyst.

6. The process of claim 1 wherein the pyrolyzing step is noncatalytic and said process further comprises a heat source for pyrolyzing said hydrocarbonaceous feed to form said first gaseous stream comprising $H_2$.

7. The process of claim 2 wherein the pyrolyzing step is carried out at a temperature more than about 650° C.

8. The process of claim 2 wherein the pyrolyzing step is carried out at a temperature of 650° C. to 1200° C.

9. The process of claim 2 wherein the pyrolyzing step is carried out at a temperature of 750° C. to 950° C.

10. The process of claim 2 wherein the pyrolyzing step is carried out at a temperature of 800° C. to 850° C.

11. The process of claim 6 wherein the pyrolyzing step is carried out at a temperature more than about 650° C.

12. The process of claim 6 wherein the pyrolyzing step is carried out at a temperature of 650° C. to 1200° C.

13. The process of claim 6 wherein the pyrolyzing step is carried out at a temperature of 750° C. to 950° C.

14. The process of claim 6 wherein the pyrolyzing step is carried out at a temperature of 800° C. to 850° C.

15. The process of claim 1 wherein the oxygen carrying gas stream contains a material selected from water, methanol, and oxygen.

16. The process of claim 1 wherein the step of introducing at least a portion of the carbon monoxide-rich gaseous fuel stream to a combustion engine comprises introducing said stream to a Diesel cycle engine.

17. The process of claim 1 wherein the step of introducing at least a portion of the carbon monoxide-rich gaseous fuel stream to a combustion engine comprises introducing said stream to an Otto cycle engine.

18. The process of claim 1 wherein the step of introducing at least a portion of the carbon monoxide-rich gaseous fuel stream to a combustion engine comprises introducing said stream to an Atkinson cycle engine.

19. The process of claim 1 wherein the step of introducing at least a portion of the carbon monoxide-rich gaseous fuel stream to a combustion engine comprises introducing said stream to an external combustion engine.

20. The process of claim 1 wherein the step of introducing at least a portion of the carbon monoxide-rich gaseous fuel stream to a combustion engine comprises introducing said stream to a gas turbine.

* * * * *